Patented June 24, 1952

2,601,659

UNITED STATES PATENT OFFICE 2,601,659

NITRILES AND PREPARATION OF THE SAME

George W. Hearne, Lafayette, and Donald S. La France, Concord, Calif., assignors to Shell Development Company, Emeryville, Calif., a corporation of Delaware No Drawing. Application January 2, 1951, Serial No. 204,096

4 Claims. (Cl. 260—465.6)

GENERAL STATEMENT OF THE INVENTION

*a.* THE PRODUCTS TO WHICH THE INVENTION RELATES

This invention relates to the lower alpha-alkylidene-beta-hydroxypropionitriles as new chemical compounds, and it particularly relates to alpha-methylidene-beta-hydroxypropionitrile as a new compound. The preparation of the new compounds of the invention also is included within the invention.

By the term lower alpha-alkylidene-beta-hydroxypropionitriles reference is made to the unsaturated hydroxy-substituted aliphatic nitriles that are represented by the formula

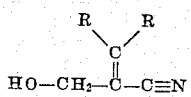

in which each R may be either hydrogen or a lower alkyl radical containing up to 3 carbon atoms, the preferred compound of this formula being alpha-methylidene - beta - hydroxypropionitrile (in which each of the members represented by R is a hydrogen atom). Other nitriles defined by the formula include, for example, alpha - ethylidene - beta - hydroxypropionitrile, alpha-isopropylidene-beta-hydroxypropionitrile, alpha - isobutylidene-beta-hydroxypropionitrile, alpha - isoamylidene-beta-hydropropionitrile, alpha-(2 - pentylidene)-beta-hydroxypropionitrile, and alpha-(4-heptylidene)-beta-hydroxypropionitrile. Of the nitriles corresponding to the formula, those wherein the alkylidene radical contains from one to three carbon atoms are generally most readily prepared and form a preferred, more limited group. Alpha-methylidene-beta-hydroxypropionitrile, apparently because of the presence of the unsubstituted methylidene group substituted on the alpha carbon atom, has some desirable properties not shared by the other members of the subgeneric and generic groups. Such properties of alpha-methylidene-beta-hydroxypropionitrile will be referred to in greater detail hereinafter.

*b.* THE PROCESS TO WHICH THE INVENTION RELATES

In accordance with the process of the invention the new nitriles are prepared by selective hydrolysis of alpha-alkylidene-beta-halopropionitriles under conditions such that the various possible side reactions, such as hydrolysis of the nitrile group, etherification, polymerization, rearrangement, and dehydrohalogenation, are substantially obviated. We have found that good yields of alpha-alkylidene-beta-hydroxypropionitrile can be obtained by subjecting an alpha-alkylidene-beta-halopropionitrile to hydrolytic treatment in an aqueous medium in the presence of a basic agent under mild conditions. By selectively replacing the halogen by hydroxyl, the alpha-alkylidene-beta-halopropionitrile is converted in good yields to the alpha - alkylidene - beta - hydroxypropionitrile containing the same number and arrangement of carbon atoms in accordance with the general equation

in which X represents an atom of halogen and X⁻ represents a halogen anion and R is as hereinbefore defined. It will be appreciated, of course, that the equation is intended to show only the over-all reaction rather than to show or to suggest a mechanism for the reaction.

The materials used in the process

As the organic reactant there is employed, as shown by the foregoing equation, an alpha-alkylidene - beta - halopropionitrile having the same carbon skeleton as the alpha-alkylidene-beta-hydroxypropionitrile that it is desired to prepare. Although the halogen atom may be an atom of any of the halogens, it is preferred to employ the bromo and the chloro compounds since they are generally the most readily prepared and cost the least. The chloro compounds are particularly preferred. Representative of such halo-substituted olefinic nitriles are alpha-methylidene - beta - chloropropionitrile, alpha - ethylidene - beta - bromopropionitrile, alpha-isopropylidene-beta-chloropropionitrile, alpha - (2-butylidene)-beta-chloropropionitrile, alpha - (3-hexylidene)-beta-chloropropionitrile and others.

Although water is the preferred aqueous medium, mixtures of water and water-miscible organic solvents may be used, such as aqueous solutions of isopropyl alcohol, dioxane, ethylene glycol, ethylene glycol monomethyl ether, acetone, or like water-miscible oxygenated organic solvents, the aqueous mixture most desirably containing a major amount, on a weight basis, of water. Generally speaking, water is the preferred aqueous medium.

As the basic agent there may be employed any suitable base or alkaline-reacting substance, with particular reference being made to the alkalinous hydroxides (and oxides), such as sodium hydroxide, potassium hydroxide, calcium hydroxide, calcium oxide, barium hydroxide, and other oxides and hydroxides of the alkali metals and alkaline earth metals, and to the alkali metal carbonates, such as sodium and potassium carbonates and bicarbonates. There also come into consideration strong organic bases, such as quaternary ammonium hydroxides, e. g., benzyltrimethylammonium hydroxide and tetramethylammonium hydroxide. Such basic agents are not completely equivalent under all conditions, for the reason that the process, which requires the use of mild correlated conditions, includes as one of the conditions the basic strength of the basic agent. For example, the use as the basic agent of a strong non-volatile alkali, such as an alkali metal hydroxide, requires compensatory use under otherwise equivalent conditions of a lower temperature and in some cases a shorter reaction time than are required when a less strongly acting base, such as sodium carbonate, is employed. Suspensions, as well as solutions of the basic agent in the aqueous medium, may be employed, solutions being preferable, particularly for large-scale application of the process because of the greater ease with which they may be handled and used.

*More detailed description of the process to which the invention relates*

The process of the invention, which may be carried out in either a batchwise, an intermittent or a continuous manner, involves treating the alpha-alkylidene-beta-halopropionitrile with the aqueous medium and the basic agent under carefully controlled conditions of amount and concentration of the basic agent, temperature and time that favor the desired selective replacement of the halogen atom by a hydroxyl group. The basic agent preferably is employed in an amount equal to from about 0.75 to about 1.25 the amount stoichiometrically equivalent to the halogen of the alpha-alkylidene-beta-halopropionitrile, i. e., from about 0.75 to about 1.25 equivalents of base per mole of alpha-alkylidene-beta-halopropionitrile, a preferred range being from about 1.0 to about 1.10 equivalents of base per mole of alpha-alkylidene-beta-halopropionitrile. The above figures are based upon the assumption that the alpha-alkylidene-beta-halopropionitrile is a neutral product (contains no traces of acid, such as HCl). If acid is present, the amount of base should, of course, be increased by the additional amount that would be equivalent to the acid present in order to provide the necessary amounts of free base based upon the halo-substituted unsaturated nitrile.

The strong alkalies preferably are employed in concentrations up to about 2 equivalents per liter of the aqueous medium, although larger amounts, if the excess over these figures is present as a suspension (rather than as a solution) in the aqueous medium, do no harm. When the base is a weaker alkali, such as a bicarbonate or a carbonate, somewhat greater concentrations in the aqueous medium can be tolerated, e. g., up to about 4 N solutions.

The conversion of the alpha-alkylidene-beta-halopropionitrile is effected by treating it with the liquid alkaline aqueous medium (which may contain suspended solids, as when an aqueous suspension of a basic agent is used) at temperatures such that undesired side reactions are avoided or minimized. Temperatures within the range of from about 30° C. to about 100° C. are employed. When the basic agent is a strong base, temperatures of from about 30° C. to not over about 60° C. are preferred, particularly when the more concentrated solutions of such strongly acting alkalies are employed, e. g., solutions more concentrated than about 0.25 N. With weaker alkalies as the basic agent, e. g., a carbonate or bicarbonate, somewhat higher temperatures are permissible under otherwise equal conditions than with the strong alkalies; thus, with such weaker alkalies temperatures up to 80° C. to 90° C., or even up to the boiling temperature of the solution, at times may be employed advantageously.

It is preferred to operate the process of the invention under certain correlated conditions of temperature and alkalinity, the latter condition conveniently being expressed in terms of the pH value of the solution where the pH value is defined as being numerically equal to the negative logarithm of the concentration (in moles per liter) of the hydrogen ion. The pH also is numerically equal to 14 less the pOH value of the solution, the pOH value being equal to the negative logarithm of the concentration (in moles per liter) of the hydroxide ion, or pH+pOH=14. It is preferred to operate at pH values of 8 to 14.5. When the pH value of the solution is higher than 14, it is preferred to operate at temperatures not over about 60° C., while at pH values of from about 8 to 12, higher temperatures, up to about 100° C., may be employed. In general, when the pH value of the aqueous medium is between 9 and 14, the higher the pH value the lower is the temperature within the hereinbefore defined ranges that is most effectively used.

The reaction time that is most effectively used will depend upon the reaction temperature and the other conditions under which the process is executed. When alpha-methylidene-beta-hydroxypropionitrile, which is soluble in water, is to be produced, the reaction time advantageously is limited to the time for dissolution of the organic phase of the reaction mixture in or with the aqueous phase thereof. In general, the course of the reaction can be followed conveniently by analyses of the amount of halogen ion in the reaction mixture since the halogen atom on the alpha-methylidene-beta-halopropionitrile, while is non-ionic, is converted to the ionic form in or by the reaction. The reaction time under any given set of conditions preferably is limited to a time no longer than is required for conversion of the non-ionic halogen to ionic halogen.

The alpha-alkylidene-beta-hydroxypropionitrile may be recovered by neutralizing any base remaining in the reaction mixture by addition of the equivalent amount of acid (e. g., HCl, H₂SO₄, etc.), distilling off water, and extracting the residue with an organic solvent to separate the desired alpha-alkylidene-beta-hydroxypropionitrile in the form of a solution in the solvent. The pure product can be recovered by fractional distillation of this solution. It will be appreciated, of course, that other methods can be used to recover the desired product, such other methods including, without being limited to, treatment with selective solvents, adsorption, precipitation from solution, and combinations thereof with or without a distillation step.

EXAMPLES

The following examples illustrate certain of the possible specific embodiments of the invention, it being understood that the examples are presented with the intent of illustrating rather than of limiting the invention as it is defined in the hereto-appended claims.

*Example 1.*—One mole of alpha-methylidene-beta-chloropropionitrile is added to an aqueous 1 N solution of sodium hydroxide containing about 1.1 mole of NaOH and the mixture is warmed to and held with occasional agitation at 45° C. to 55° C. for two hours, at which time a homogeneous mixture has formed. The solution then is neutralized by addition of hydrochloric acid and water is distilled off in vacuo. The salt cake remaining is leached with methanol and the methanol solution is fractionally distilled under reduced pressure. Alpha-methylidene-beta-hydroxypropionitrile is collected as the fraction distilling at 94° C. to 95° C. under 6 to 7 mm. Hg pressure. The specific gravity (20°/4°) of alpha - methylidene-beta-hydroxypropionitrile is about 1.036 and the refractive index is about 1.457. The molecular refraction (sodium D line) is found to be 21.8 compared to a calculated value of 21.5.

*Example 2.*—Alpha-methylidene-beta-chloropropionitrile is added to about 1.1 times its weight of 1 N aqueous sodium hydroxide solution at 15° C. to 20° C. No reaction is apparent. Upon warming to about 45° C. the organic phase commences to pass into solution in the aqueous phase. When solution is complete, i. e., when a homogeneous mixture forms, alpha-methylidene-beta-hydroxypropionitrile is recovered by the method used in the foregoing example.

*Example 3.*—Example 1 is repeated using alphamethylidene-beta - bromomethylpropionitrile in place of the alpha-methylidene-beta-chloromethylpropionitrile. Alpha-methylidene - beta-hydroxypropionitrile is obtained as product.

*Example 4.*—Alpha-ethylidene - beta - chloropropionitrile is warmed to about 50° C. in admixture with 1.05 equivalents of KOH in the form of an about 0.85 N solution in water. When about 75% of the theoretical amount of chloride ion is formed the reaction mixture is neutralized, distilled until a slurry remains in the still kettle, and alpha-ethylidene-beta hydroxypropionitrile is recovered from the slurry by the method illustrated in Example 1. Analysis of the product for nitrogen and hydroxyl contents are in good agreement with the values calculated for the formula.

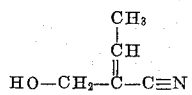

*Example 5.*—In the manner illustrated in the foregoing examples, alpha-isopropylidene-beta-hydroxypropionitrile is prepared from alpha-isopropylidene - beta - bromopropionitrile. The formula for the product is

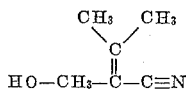

*Uses for the lower alpha-alkylidene-beta-hydroxypropionitriles of the invention*

The alpha-alkylidene-beta - hydroxypropionitriles may be used as biologically active materials and as intermediates for the preparation of biologically active materials. They are also of interest as intermediates for the preparation of special solvents, plasticizers, and the like, and as resin intermediates. For this last application, alpha-methylidene-beta-hydroxypropionitrile is of particular interest because of its unique structure. A consideration of the formula will show that alpha - methylidene-beta-hydroxypropionitrile amalgamates in one molecule the structures of both allyl alcohol

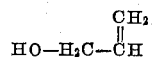

and acrylonitrile

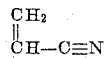

Alpha-methylidene - beta - hydroxypropionitrile may be polymerized as such or in the form of an ester thereof with a fatty or other acid, such as acetic, propionic, butyric, or higher fatty acid, which may be substituted by hydroxy, chloro, or the like, or as an ester with acrylic, methacrylic, chloroacrylic, or other polymerizable ethylenic acid. Customary polymerization catalysts, such as a peroxide, e. g., di-tertiary-butyl peroxide, tertiary-butyl perbenzoate, or dibenzoyl peroxide, may be used in the preparation of the polymers. Depending upon the conditions used the polymers range from viscous liquids to soft to hard solids. Copolymers with other polymerizable ethylenic compounds can be prepared, e. g., with esters of acrylic acid of substituted acrylic acids, acrylamide, acrylonitrile, vinyl chloride, vinyl acetate, diallyl phthalate, and the like, the copolymers containing from as little as 5% to as much as 99% of the alpha-methylidene-beta-hydroxypropionitrile or ester of the same. The polymers, depending upon the physical characteristics of the particular polymer, can be used in or as surface coatings, impregnating materials, molding resins, thickness for lubricating oils of the petroleum, as well as of the synthetic variety, and as or in adhesives.

We claim as our invention.

1. Alpha - ethylidene - beta - hydroxypropionitrile.

2. The process which comprises mixing alpha-methylidene - beta - chloropropionitrile with an amount of an about 1 N solution of sodium hydroxide containing about 1.1 moles of sodium hydroxide per mole of said alpha-methylidene-beta-chloropropionitrile and heating the mixture at about 45° C. to 55° C. until a homogeneous mixture forms to produce alpha-methylidene-beta-hydroxypropionitrile.

3. The method of converting alpha-methylidene-beta-chloropropionitrile to alpha-methylidene-beta-hydroxypropionitrile, which method comprises heating said alpha-methylidene-beta-chloropropionitrile with an aqueous solution of an alkalinous hydroxide, said solution having a pH value of from about 8 to 14.5, at a temperature within the range of from about 30° C. to about 60° C.

4. The method of preparing an alpha-alkylidene-beta-hydroxypropionitrile which comprises hydrolyzing an alpha-alkylidene-beta-halopropionitrile in an aqueous medium in the presence of a controlled amount of a basic agent at a temperature within the range of from about 30° C. to about 100° C. to produce said alpha-alkylidene-beta-hydroxypropionitrile.

GEORGE W. HEARNE.
DONALD S. LA FRANCE.

REFERENCES CITED

The following references are of record in the file of this patent:

UNITED STATES PATENTS

| Number | Name | Date |
|---|---|---|
| 2,453,824 | Wood | Nov. 16, 1948 |
| 2,466,641 | Hearne et al. | Apr. 5, 1949 |

OTHER REFERENCES

Chemical Abstracts, vol. 43, index, p. 10061 (1949).